W. S. MORTON.
WORM DRIVE FOR MOTOR VEHICLES.
APPLICATION FILED APR. 8, 1914.
Reissued Dec. 28, 1915.
14,039.
3 SHEETS—SHEET 1.
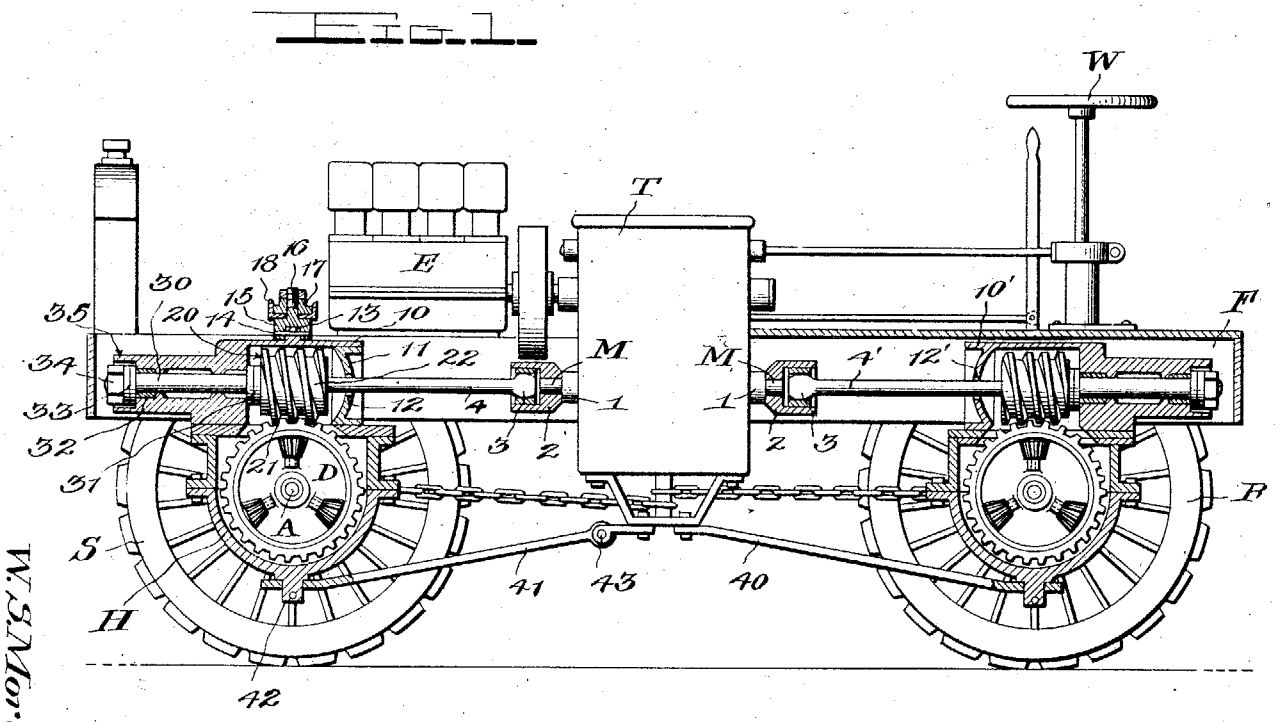
Inventor
W. S. Morton,
Witnesses
Alex. L. Giesbauer
C. Clemens
By H. R. Wilkinson & Co.
Attorneys W. S. MORTON.
WORM DRIVE FOR MOTOR VEHICLES.
APPLICATION FILED APR. 8, 1914.
Reissued Dec. 28, 1915. 14,039.
3 SHEETS—SHEET 2.
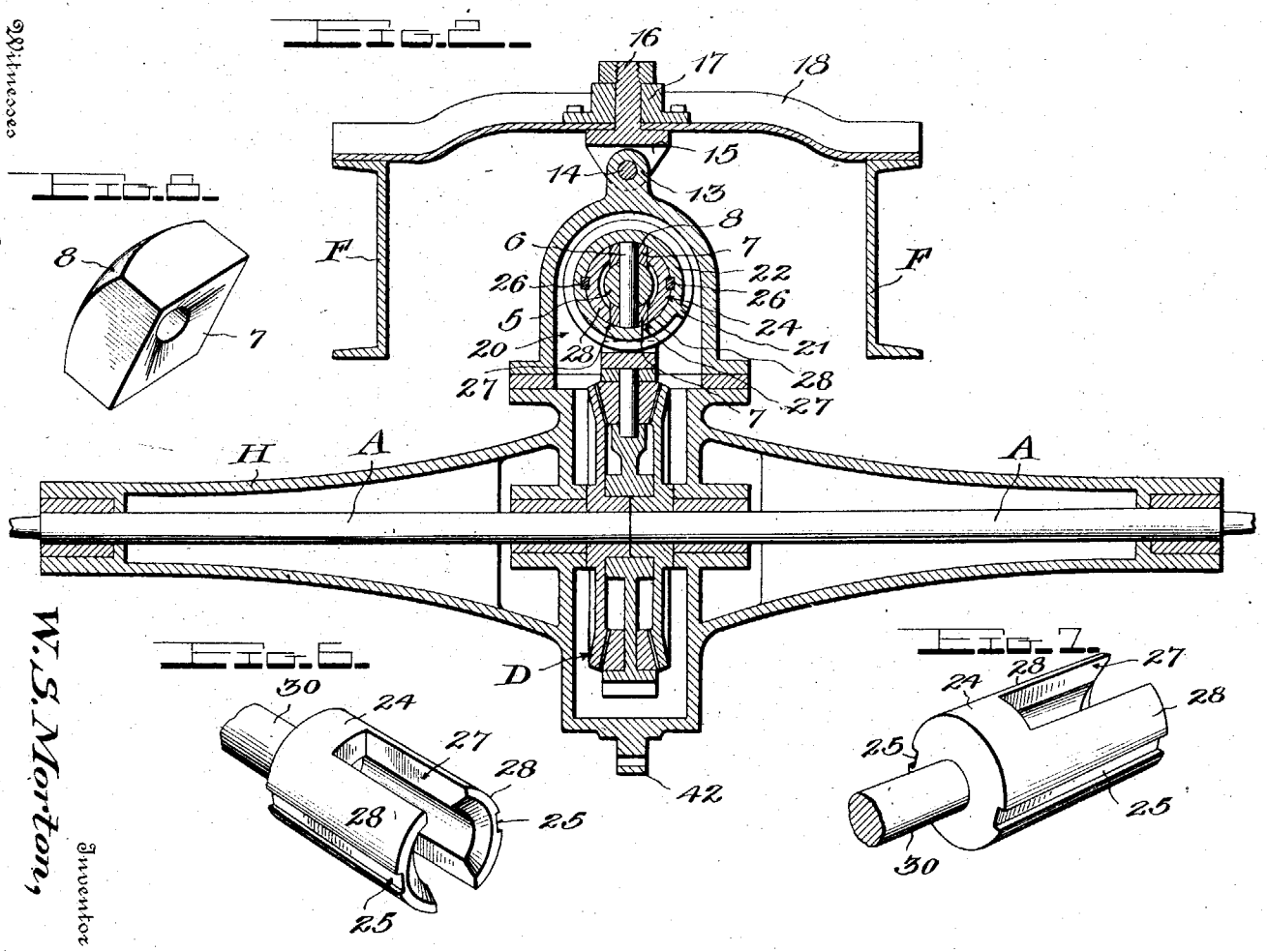
Witnesses
Chas. L. Grinnan
C. Cannon
Inventor
W. S. Morton,
By H. R. Wilson & Co.
Attorneys W. S. MORTON.
WORM DRIVE FOR MOTOR VEHICLES.
APPLICATION FILED APR. 8, 1914.
Reissued Dec. 28, 1915.
14,039.
3 SHEETS—SHEET 3.
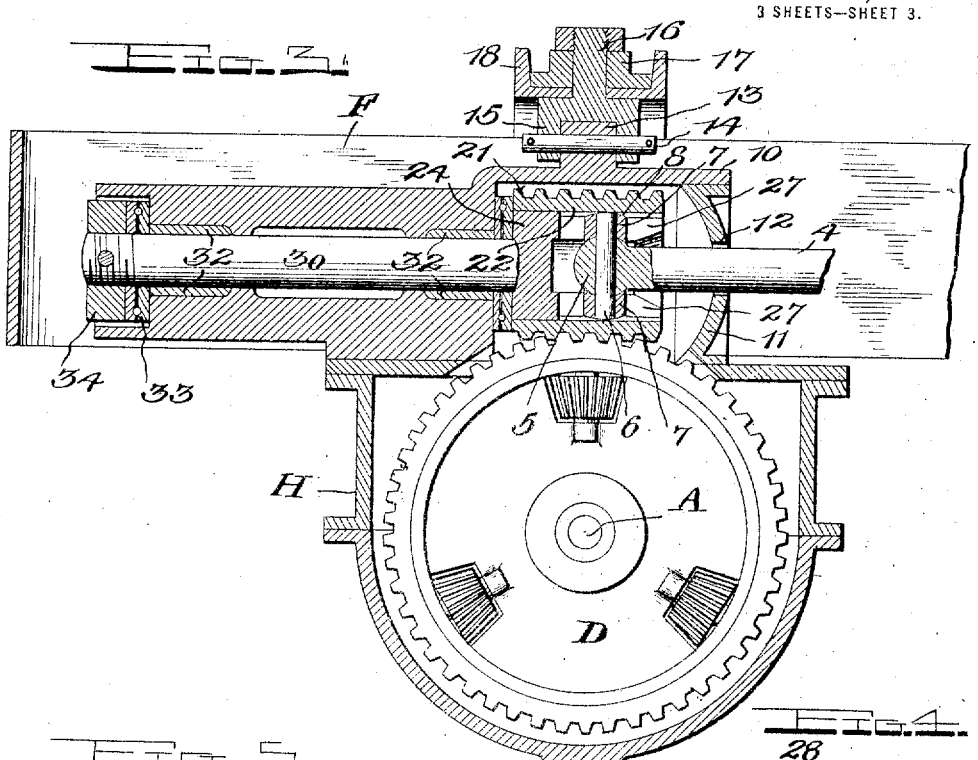
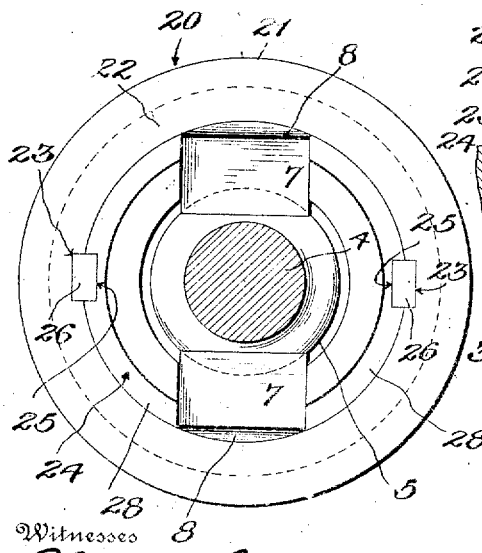
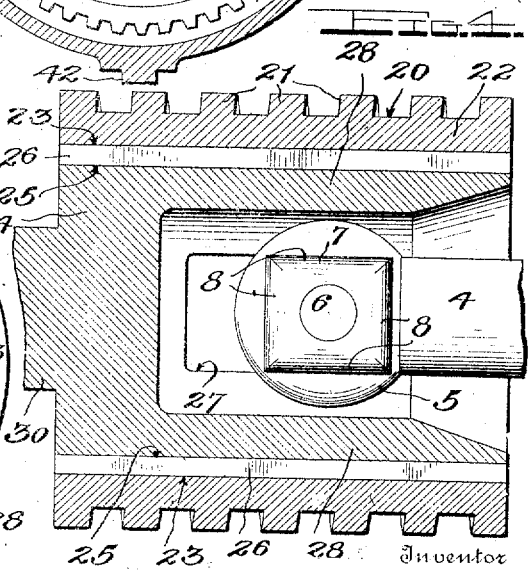
Witnesses
Chas. L. Gunsbauer
E. [illegible]
Inventor
W. S. Morton,
By H. R. Wilson & Co
Attorneys

UNITED STATES PATENT OFFICE.

WALTER S. MORTON, OF HARRISBURG, PENNSYLVANIA.

WORM-DRIVE FOR MOTOR-VEHICLES.

14,039. Specification of Reissued Letters Patent. Reissued Dec. 28, 1915.

Original No. 1,076,052, dated October 21, 1913, Serial No. 724,670. Application for reissue filed April 8, 1914. Serial No. 830,552.

*To all whom it may concern:*

Be it known that I, WALTER S. MORTON, a citizen of the United States of America, residing at Harrisburg, in the county of Dauphin and State of Pennsylvania, have invented certain new and useful Improvements in Worm-Drives for Motor-Vehicles.

This invention relates to mechanical drives and more especially to the driving mechanism of motor vehicles.

The principal object of the invention is to provide a mechanical drive so constructed that the driven element will be driven at all times without strain and in any position in which it may be disposed and which when applied to a machine or vehicle, adapts said machine to be easily and readily guided.

Another object is to provide a mechanical drive having a hollow worm in which a universal joint is disposed and which connects the driving shaft to said worm, said joint being disposed at or near the point of mesh of the worm with its gear.

Another object is to produce improved means for driving both axles by worms on the driving shaft, which latter is made in sections connected by peculiar forms of universal joints so that the necessary movements of the axles beneath the framework is permitted.

These and other objects are carried out by constructing my invention in the manner hereinafter more fully described and claimed, and as shown in the drawings wherein—

Figure 1 is a central longitudinal sectional view through a motor vehicle possessing this improved worm drive. Fig. 2 is an enlarged cross section through the steering axle thereof. Fig. 3 is an enlarged longitudinal section through the center of the driving mechanism for said steering axle, and through its differential. Fig. 4 is a still further enlarged horizontal section through the universal joint of said driving mechanism, and Fig. 5 is an end view thereof taken from the right of Fig. 4. Figs. 6 and 7 are perspective views of the so called "plug," taken from different angles, and Fig. 8 is a perspective detail of the so called "block".

In the drawings the invention is shown applied to a motor vehicle or truck comprising the front or steering wheels S, the rear wheels R, all mounted on axles A inclosed within housings H and employing any well known form of differentials D; and F is the framework on which is supported an engine E whose shaft is connected through suitable transmission mechanism T with the main or driving shaft M. In the present illustration the truck is steered by means connecting the steering wheel W at the rear of the frame F with the front axle which carries the front wheels S, and said connections are shown as including chains C.

The purpose of the present invention is to employ a worm drive mechanism connecting the main shaft M with both axles, and a motor vehicle thus briefly described, and whose details form no part of the present invention. The drive mechanism is designed to permit the rocking motion of the front axle as one of its wheels S passes over an obstruction, as well as the oscillation thereof as this axle is turned around the king bolt by the steering mechanism, and enables a continuous drive without strain to be effected in whatever position the axle may be.

Referring more particularly to the details of the present invention, the numeral 1 designates bearings in the front and rear sides of the housing for the transmission T, through which bearings project the extremities of the main shaft M which—as usual with machines of this character—is connected with the engine shaft through mechanism for imparting a proper speed to the main shaft and through a clutch for starting and stopping the rotation thereof at will. In the present case it is my purpose to connect both extremities of the main shaft M to the axles, and, in so far as the connections in front and in rear of the transmissions are duplicates of each other, a description of one will suffice for both.

The numeral 2 designates the cupped or female member of a universal joint attached to the extremity of the main shaft M, and the numeral 3 the male member thereof which is connected with one extremity of a shaft section 4 leading forward (or backward) from the transmission T to a point over the axle A. Here the outer extremity of the shaft section 4 carries a ball 5 through which extends a transverse pin or bolt 6, and on each end of said pin is mounted a block 7 which is preferably square in cross section as shown in Fig. 8 but whose inner face is dished to fit around the ball and whose outer face 8 is rounded as shown, to produce a concavo-convex block. In the illustration herewith the same universal joint 2—3 is employed at the rear end of the main shaft M, and the rear-shaft section 4′ leads through a hole 12′ in a casing 10′ to and is connected directly with a worm which engages a gear around the differential mechanism D of the rear axle; but as this worm is supported in substantially the same manner as that over the front axle yet to be described, and needs no universal joint within it since the rear axle is not pivoted on a king bolt, further description of the rear portion of the machine will not be necessary.

The numeral 10 designates a tubular casing loosely inclosing the front shaft section 4 and having its rear end removably closed by a dust guard 11 pierced with a lateral slot 12 through which said shaft section moves, the casing 10 being suitably mounted upon the housing H for the front axle and open at its bottom so that the worm and worm gear may mesh as described below. The upper side of the casing 10 carries an apertured lug or knuckle 13 in which is mounted a horizontal pivot pin 14 which extends also through arms of a fork 15 which straddle said lug and are secured to the lower end of a king bolt 16, which latter stands upright and is suitably mounted within a bearing 17 supported at the center of an arched yoke 18 connecting the side bars of the frame F as best seen in Fig. 2. The fork-arms constitute knuckles between which stands the lug or knuckle 13, and the pivot pin 14 connecting them permits the vertical rocking of the axle A as one of its wheels passes over an obstruction; whereas the function of the king bolt is, as usual, to permit the horizontal oscillation of the front axle as it is turned by the steering mechanism hereinbefore referred to. With either movement, or with the combined movements of the axle and its housing 4, the casing 10 and its contained mechanism participate, and therefore the connection between the front end of the shaft section 4 and the gear surrounding the differential D must be such as to permit these movements of the casing 10.

The worm gear 20 surrounding the differential D may be of any suitable character, but the worm 21 meshing therewith is formed of threads surrounding a tubular shell 22 whose bore flares slightly toward the inner end and is provided internally with two longitudinal key ways 23; and within this shell is closely fitted a plug 24 externally provided with key ways 25 adapted to register with those numbered 23 so that the keys 26 may be driven therein, the inner end of the plug flaring slightly to fit the bore of the shell and being forked or bifurcated on a line at right angles to the key ways so as to produce an upright slot 27 in which the blocks 7 work freely but wherein they are confined between the fork arms 28.

The entire worm is carried by the rear end of a shaft 30 which is preferably formed integral with the axis of the plug 24, said shaft—or more properly "spindle"—projecting thence forward along the center of the framework F, through a thrust bearing 31, thence through one or more ordinary roller or ball bearings 32, then through another thrust bearing 33 and finally receiving a nut 34 on its forward extremity. These various bearings are mounted within a tubular extension 35 which may be attached to or form an integral part of the casing 10 that incloses the worm and is mounted on the axle housing H, and when the latter turns or rocks it is obvious that the casing will move with it and also the tubular extension 35 as there is ample room for it to play between the side bars of the frame F. Thus is produced a long bearing for the spindle 30 upon which of course a great deal of strain is thrown as the shaft section 4 is turned by power to drive the vehicle in either direction. Longitudinal movement of said spindle in either direction is resisted by the thrust bearings, forward movement of the worm is resisted by the rearmost thrust bearing 31, and rearward movement of the worm is resisted by the fact that its interior tapers toward the front and fits closely around the exterior of the fork arms 28 and plug 24 which also taper in the same direction, whereas the keys 26 hold these parts against relative rotation.

With respect to the rear axle, the drawings herewith show the same spindle and its bearings, and the same worm engaging a worm gear; but if the rear axle is not mounted on a king bolt, there is no necessity for a universal joint on the inside of the worm and the latter may therefore be mounted on the rear extremity of the rear shaft section 4′ in any suitable manner so as to cause it to rotate therewith. In such event the brace 40 connecting the rear housing H with some part of the framework need not be pivoted as is the front brace 41 at the points 42 and 43.

When the vehicle passes over an obstruction which for instance will ordinarily lift first one front wheel and then the rear wheel directly behind it, the front axle will cant or tilt on its pivot 14, and in such movement it will carry with it the entire casing 10 and its extension 35 and all parts within the same, the two universal joints between the transmission mechanism and worm over the front axle permitting the canting of the latter as described. As the front wheel passes over the obstruction the axle resumes its horizontal position, and meanwhile the frame F of the machine has not been put under strain. When now the rear wheel strikes the same obstruction the rise of one end of the rear axle will cause the frame to rise with it, but as the front axle by this time is traveling on level ground the same pivot 14 permits the canting of the entire framework. When the front axle is turned aside on its king bolt by the steering mechanism, the entire casing 10 and its extension 35 and all that they contain turn with such axle as the forward universal joint will permit, and yet there is no interruption to the transmission of power from the engine to said axle, whatever the position of the latter.

As first above stated, the drawings herewith illustrate the rear axle as fixed but it will be clear from the description above that the mechanism herein shown for the front axle could be duplicated over the rear axle by the simple addition of short-turning mechanism to cause the rear axle to turn in an opposite direction to the front axle when the device is to be steered. I do not, therefore, wish to be confined to the use of my invention in connection with one axle only; and the details of construction, as well as the proportions and materials of parts are not essential to the present invention.

I claim as my invention:

1. In a mechanical drive for vehicles, the combination of a driving shaft, a driven shaft mounted for swinging movement in both horizontal and vertical planes from its central point, a gear at said central point of the driven shaft, a second gear meshing with the first mentioned one, and a flexible driving joint between said driving shaft and the interior of said second mentioned gear, said joint being arranged opposite the meshing point of said gears and also intersecting a vertical line passing through the central point of said driven shaft.

2. In a mechanical drive for vehicles, the combination of a driving shaft, a two part driven shaft mounted for swinging movement in both horizontal and vertical planes from its central point, a differential mechanism between the two parts of said swinging driven shaft, a gear operatively connected to said differential mechanism and arranged at said central point of the driven shaft, a second gear meshing with the first mentioned one and a flexible driving joint between said driving shaft and said second mentioned gear, said joint being arranged in the line of the axis of horizontal swinging movement of said driven shaft, and in a vertical line passing through the central point of the driven shaft.

3. In a driving and steering mechanism for motor vehicles, the combination of an axle mounted to swing both horizontally and vertically, both swinging movements taking place from supporting means located in line with the central vertical axis of the axle, a driving shaft, and a pair of meshing gears and a flexible connection connecting the axle in driven relation with the shaft, both of said gears and the flexible connection intersecting a line passing centrally and vertically through the axle.

4. In a driving and steering mechanism for motor vehicles, the combination of an axle mounted to swing horizontally and vertically, a worm gear operatively connected to the axle intermediate the ends of the latter, a worm meshing with said worm gear and intersecting a line passing centrally and vertically through the axle, a driving shaft, and a flexible connection between the driving shaft and the worm.

5. In a driving and steering mechanism for motor vehicles, the combination with an axle pivotally suspended to swing both vertically and horizontally, a worm gear mounted on the central portion of the axle, a worm located above the worm gear, but below the pivot points of the axle, said worm meshing with the worm gear, a driving shaft, and a flexible connection between one end of the said shaft and the worm, the pivot points for the axle, the worm gear and worm and the flexible connection all being arranged in vertical alinement and in a line passing centrally and vertically through the axle.

6. The combination with a suitable support, of a casing swingingly suspended from said support, an axle housing connected with and depending from the casing, an axle mounted within the housing, a gear mounted upon the central portion of the axle, a second gear mounted within the swinging casing above the gear on the axle and adapted to mesh with the latter, a driving shaft, and a flexible connection between the driving shaft and the gear within the casing.

7. The combination with a suitable support, of a casing suspended to swing horizontally and vertically relative to said support, an axle housing suspended from and adapted to swing with the casing, an axle within the housing, a gear mounted upon the central portion of the axle, a second gear located within the casing and meshing with the gear on the axle, a driving shaft, and a flexible connection between the driving shaft and the gear within the casing.

8. In a driving and steering mechanism for motor propelled vehicles, the combination of an axle mounted for horizontal swinging movement for steering purposes and for vertical swinging movement to compensate for uneveness in the roadway, a worm gear operatively connected to the axle and arranged midway between its ends, a hollow worm meshing with the top of said gear and intersecting the axis of the vertical pivot of the axle, a driving shaft and a flexible joint between the latter and the worm, said joint being disposed within the worm and in the axis of the vertical pivot of the axle.

9. In a driving and steering mechanism for motor propelled vehicles, the combination of a two part axle mounted for horizontal swinging movement for steering purposes and for vertical swinging movement to compensate for uneveness in the roadway, a differential mechanism uniting the two parts of said axle, a worm gear operatively connected to the differential mechanism and arranged midway between the ends of the axle and in the axis of its vertical pivot, a hollow worm meshing with said gear and intersecting the axis of the vertical pivot of the axle, a driving shaft, and a universal joint between the driving shaft and the interior of said worm, said joint being arranged in the axis of the vertical pivot of the axle.

10. In a driving and steering mechanism for motor propelled vehicles, the combination of a frame, an axle bearing member, a two part axle carried by the latter, a differential mechanism uniting the two parts of said axle, a worm gear operatively connected to said differential mechanism and arranged midway between the ends of the axle, a double pivotal connection between said frame and the axle bearing member to permit the axle to swing horizontally for steering purposes and vertically to compensate for uneveness in the roadway, a hollow worm meshing with said gear and arranged to intersect the vertical pivotal axis about which the axle swings, a driving shaft and a universal joint between the latter and said worm, said joint being arranged in the hollow worm and opposite its meshing point with said gear.

11. In a mechanical drive, a supporting structure, an upright pivot revolubly mounted therein, an axle supporting casing, a shaft disposed in a plane at right angles to said pivot and connecting said casing and pivot and permitting said casing to swing in a vertical plane, an axle mounted in said casing and extending in a plane at right angles to said casing carrying shaft, a driving shaft arranged in a plane parallel with said casing carrying shaft and provided with a universal joint arranged at the intersection of the plane of movement of said axle and a driving connection between said driving shaft and axle.

12. In a worm drive for motor vehicles, the combination with a vehicle frame, a housing, an axle mounted in said housing, a casing mounted on said housing, a king bolt in the frame, a pivot between the king bolt and casing, a worm gear carried by the axle, a hollow worm journaled within said casing and engaging said worm gear, a shaft section connected with the motor and extending into said worm and having a flexible driving connection therewith arranged beneath said king bolt and opposite the meshing point of the worm and gear.

13. In a worm drive for motor vehicles, the combination with an axle carrying wheels, a differential mechanism interposed within said axle, a worm gear surrounding said differential, a housing for the axle, a casing secured thereon, flexible connections between said casing and the frame of the vehicle, a hollow worm journaled within said casing, a motor driven shaft section, and a flexible connection between said shaft section and worm located within the interior of the latter and opposite the meshing point of the worm and gear.

14. In a worm drive for motor vehicles, the combination with the vehicle frame, the axle and its housing, a casing mounted on the latter, a king bolt in the frame, a pivot between the king bolt and casing, and a worm gear carried by the axle; of a hollow worm journaled within said housing and engaging said worm gear, the bore of the worm having longitudinal slots, a shaft section connected with the motor, and a ball on the extremity of said section standing beneath said king bolt and having blocks engaging said slots, for the purpose set forth.

15. In a worm drive for motor vehicles, the combination with the vehicle frame, the axle and its housing, a casing mounted on the latter, a king bolt in the frame, a pivot between the king bolt and casing, and a gear carried by the axle; of a tubular extension projecting from said casing, a spindle journaled therein and forked at its inner end, a hollow worm disposed within said casing and secured around the forked end of the spindle so that the fork-arms produce an internal slot, a horizontally slotted dust guard at the inner end of said casing, a shaft section connected with the motor and projecting through the slot in said dust guard, and blocks carried by its front end and engaging said slots within the worm at a point above the axle for the purpose set forth.

16. In a worm drive for motor vehicles, the combination with the vehicle frame, the axle and its housing, a casing mounted on the latter, a king bolt in the frame, a pivot between the king bolt and casing, and a worm gear carried by the axle; of a bearing carried by said casing, a spindle journaled in such bearing and having a forked plug at its inner end, a hollow worm engaging said worm gear and keyed around the arms of said fork, a shaft section connected at its inner end with the motor, and blocks at its front end standing over said axle and engaging the slot between the fork-arms, for the purpose set forth.

17. In a worm drive for motor vehicles, the combination with the vehicle frame, the axle and its housing, a casing mounted on the latter, a king bolt in the frame, a pivot between the king bolt and casing, and a worm gear carried by the axle; of a bearing carried by said casing, a spindle journaled therein and carrying at its inner end a plug externally flaring inward and transversely slotted to produce fork arms, said arms having key ways at right angles to the slot between them, a tubular worm standing within said casing and engaging the worm gear, its interior being flaring to fit upon said plug and its fork-arms and having key ways adapted to register with those therein, keys in the ways, a shaft section connected at its inner end with the motor, a ball at the outer end thereof standing within said worm and normally over said axle, a pin extending transversely through the ball, and blocks on the extremities of said pin sliding in the slot between the fork-arms, for the purpose set forth.

18. In a worm gear mechanism, the combination with the driven element, a worm gear thereon, a housing for said element and gear having an opening through which the latter projects, a casing secured upon the housing, and flexible connections between said casing and the framework of the machine; of a bearing carried by said casing, a spindle journaled therein and carrying at its inner end a plug externally flaring inward and transversely slotted to produce fork arms, said arms having key ways at right angles to the slot between them, a tubular worm standing within said casing and engaging the worm gear, its interior being flaring to fit upon said plug and its fork-arms and having key ways adapted to register with those therein, keys in the ways, a shaft section connected at its inner end with the motor, a ball at the outer end thereof standing within said worm and normally over said axle, a pin extending transversely through the ball, and blocks on the extremities of said pin sliding in the slot between the fork-arms, for the purpose set forth.

In testimony whereof I have hereunto set my hand in presence of two subscribing witnesses.

WALTER S. MORTON.

Witnesses:

J. A. GRIESBAUER,

C. GIOVANNETTI.